(12) United States Patent
Alhussan

(10) Patent No.: US 11,453,495 B1
(45) Date of Patent: Sep. 27, 2022

(54) DOUBLE WING AIRCRAFT AND METHOD OF USE

(71) Applicant: Khaled Abdullah Alhussan, Riyadh (SA)

(72) Inventor: Khaled Abdullah Alhussan, Riyadh (SA)

( * ) Notice: Subject to any disclaimer, the term of this patent is extended or adjusted under 35 U.S.C. 154(b) by 328 days.

(21) Appl. No.: 16/293,257

(22) Filed: Mar. 5, 2019

Related U.S. Application Data

(60) Provisional application No. 62/638,899, filed on Mar. 5, 2018.

(51) Int. Cl.
*B64C 39/08* (2006.01)
*B64D 27/14* (2006.01)
*B64C 5/06* (2006.01)

(52) U.S. Cl.
CPC ............... *B64C 39/08* (2013.01); *B64C 5/06* (2013.01); *B64D 27/14* (2013.01)

(58) Field of Classification Search
CPC .... B64C 1/26; B64C 5/02; B64C 5/06; B64C 39/08; B64D 27/20
See application file for complete search history.

(56) References Cited

U.S. PATENT DOCUMENTS

| | | | | |
|---|---|---|---|---|
| 2,470,602 A * | 5/1949 | Campbell | ............... | B64C 39/08 244/45 A |
| D166,843 S * | 5/1952 | Bailey | ..................... | B64C 39/08 D12/331 |
| 3,834,654 A * | 9/1974 | Miranda | ................ | B64C 39/068 244/13 |
| 4,165,058 A * | 8/1979 | Whitener | ................ | B64C 39/08 244/15 |
| 4,365,773 A * | 12/1982 | Wolkovitch | .......... | B64C 39/068 244/123.7 |
| 4,390,150 A * | 6/1983 | Whitener | ................ | B64C 39/08 244/13 |
| 5,071,088 A * | 12/1991 | Betts | .................... | B64C 29/0066 244/12.1 |
| 5,899,409 A * | 5/1999 | Frediani | ................ | B64C 39/068 244/13 |
| 5,957,405 A * | 9/1999 | Williams | .................. | B64C 1/00 244/15 |
| 5,975,464 A * | 11/1999 | Rutan | ..................... | B64C 39/02 244/118.2 |
| 6,089,504 A * | 7/2000 | Williams | .................. | B64C 1/00 244/53 B |
| 8,157,204 B2 * | 4/2012 | Wilby | ..................... | B64C 39/08 244/25 |
| 10,377,488 B1 * | 8/2019 | Reusch | .................... | B64C 3/185 |
| 10,899,447 B2 * | 1/2021 | Hernadi | ................ | B64C 39/068 |
| 2004/0195433 A1 * | 10/2004 | Kayama | .................. | B64C 39/08 244/10 |

(Continued)

*Primary Examiner* — Richard R. Green
*Assistant Examiner* — Michael A. Fabula
(74) *Attorney, Agent, or Firm* — Leavitt Eldredge Law Firm

(57) ABSTRACT

A dual-wing aircraft includes a body extending from a front end to a rear end; a front wing, having: a first section secured to the body; and a second section secured to an opposing side of the body; a rear wing, having: a third section secured to the body; and a fourth section secured to the opposing side of the body; a tail wing rigidly attached to the body and positioned between the front wing and the rear wing.

6 Claims, 6 Drawing Sheets

(56) References Cited

U.S. PATENT DOCUMENTS

| | | | |
|---|---|---|---|
| 2011/0315809 A1* | 12/2011 | Oliver | B64D 27/06 244/12.4 |
| 2012/0012692 A1* | 1/2012 | Kroo | B64C 39/08 244/6 |
| 2019/0241260 A1* | 8/2019 | Alhussan | B64D 35/04 |

* cited by examiner

DOUBLE WING AIRCRAFT AND METHOD OF USE

BACKGROUND

1. Field of the Invention

The invention relates to generally to aircraft, and more specifically, to a double wing aircraft.

2. Description of Related Art

Conventional aircraft, as shown in FIG. 1, are well known in the art and provide effective means to transport persons and/or other forms of cargo during flight. As depicted, the flight regime 101 includes utilizing an aircraft 103 having a propulsion system, e.g., a turboprop, configured to produce forward thrust, which in turn creates lift via one or more airfoils. Although effective in most applications of use, there are limitations when utilizing aircraft 103 at different flight regimes and during flight through different air stream conditions.

For example, it should be understood that the conventional aircrafts are typically configured for optimal flight performance within a determined height, such as reaching a height 105 along trajectory path 1 A-1 B, wherein the air properties change. Although great strides have been made in the art, many shortcomings remain. Accordingly, there is a need for an aircraft that overcomes the limitations found in the present art.

It is believe that the present aircraft with the specific design features overcome the problems commonly associated with conventional aircraft.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
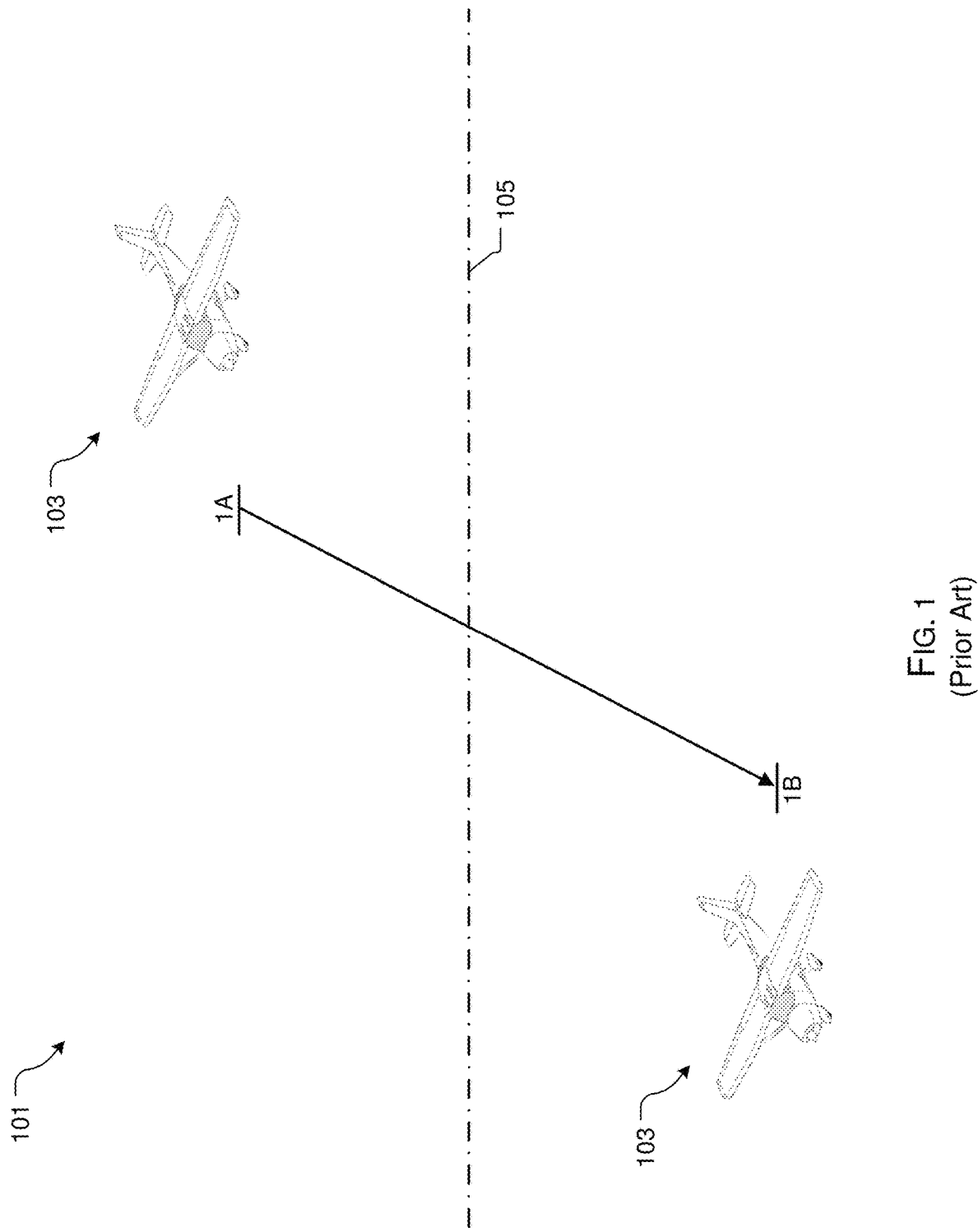
FIG. 1 is an oblique view of a conventional aircraft.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 2-9 depict various views of a dual wing aircraft 201 in accordance with one preferred embodiment of the present application. It will be appreciated that aircraft 201 overcomes one or more of the above-listed problems commonly associated with conventional aircraft. In one contemplated embodiment, the aircraft 201 is an unmanned aerial vehicle; however, it will be appreciated that the teachings discussed herein could be utilized on both unmanned and manned aircraft.

In the contemplated embodiment, aircraft 201 includes one or more of a streamlined body 203 extending from a tapered front end 223 to a back end 225. The body is streamlined with an outer surface 227 and with a narrow section 229 wherein the propulsion system 217 is secured. The preferred embodiment could include a body 203 that forms a hollow interior for securing one or more of a drive assembly, power assemblies, actuators, computer devices, transmitters, electronics, and other associated components necessary to control flight maneuverability and to power the rotor assemblies during flight.

Although not shown, it will be appreciated that the intended use of aircraft 201 could include features such as carrying a payload (not shown) between locations, reconnaissance, picture taking, leisure activities, and the like. Accordingly, the aircraft 201 could be adapted with a quick-release devices secured to the body and configured to releasably engage with one or more payloads.

The aircraft 201 is further provided with a forward wing 205 rigidly secured to the front section of the body 203, while an aft wing 207 is rigidly secured to a rear section of the body 203. During flight, the wing sections 209, 211, 213, and 215 are contoured to provide lift and could include flaps, ailerons, and the like to manipulate airflow around the wings. The aircraft is further provided with a tail wing 219 secured to the propulsion system 217. The propulsion system includes an engine 221 that provides the required forward thrust to achieve flight.

It will be appreciated that the wings 205 and 207 are spaced apart at a height relative to each other. This feature provides additional stability and control of the aircraft during flight. In the contemplated embodiment, wing 205 includes wing sections 209, 211, while wing 207 includes sections 213, 215; whereas an alternative embodiment could include a single wing in lieu of sections. In the preferred embodiment, the height between the wings is at a fixed position; however, it will be appreciated that alternative embodiments could include wings that have variable heights.

One of the unique features believed characteristic of the present invention is the use of contoured body having a section 229 tapered inwardly towards the centerline of the body. Further it is believed that the placement of the propulsion system near the center of the body and proximate to the tapered section are all unique features of the present invention. These and other unique feature are believed unique to the present invention.

Figure 2:
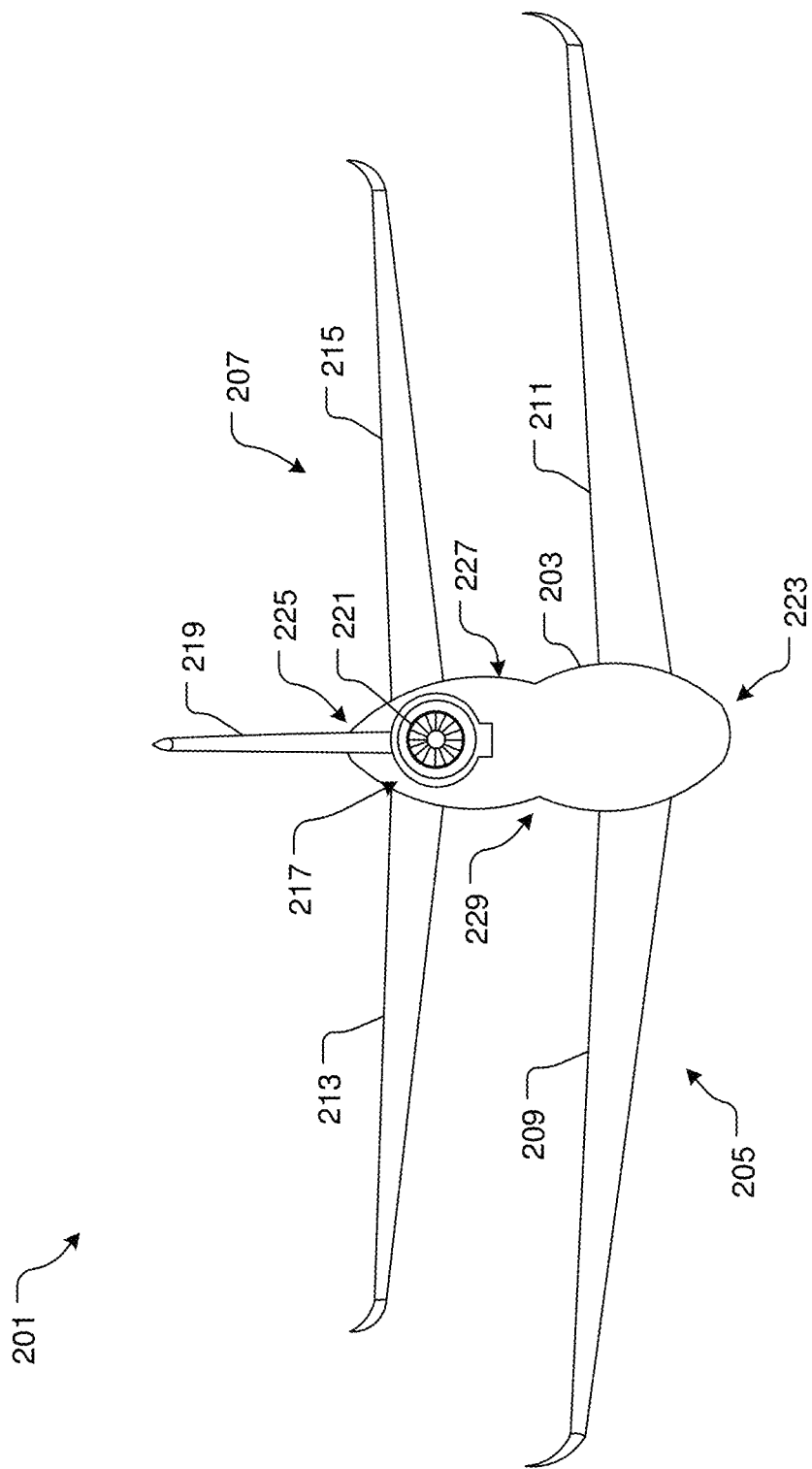
FIG. 2 is an oblique front view of an aircraft in accordance with a preferred embodiment of the present application.
Figure 3:
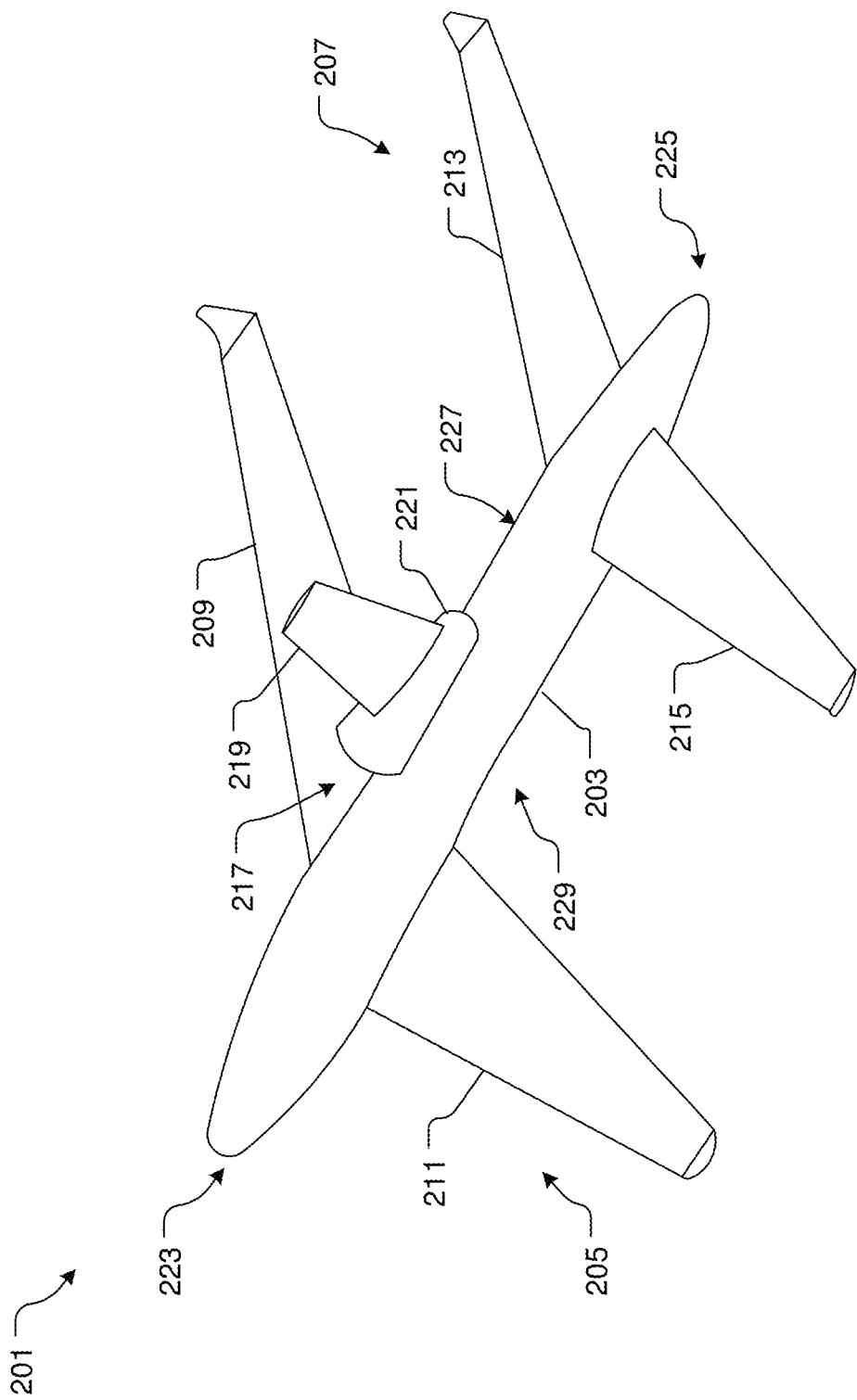
FIG. 3 is an oblique side view of the aircraft of FIG. 2.
Figure 4:
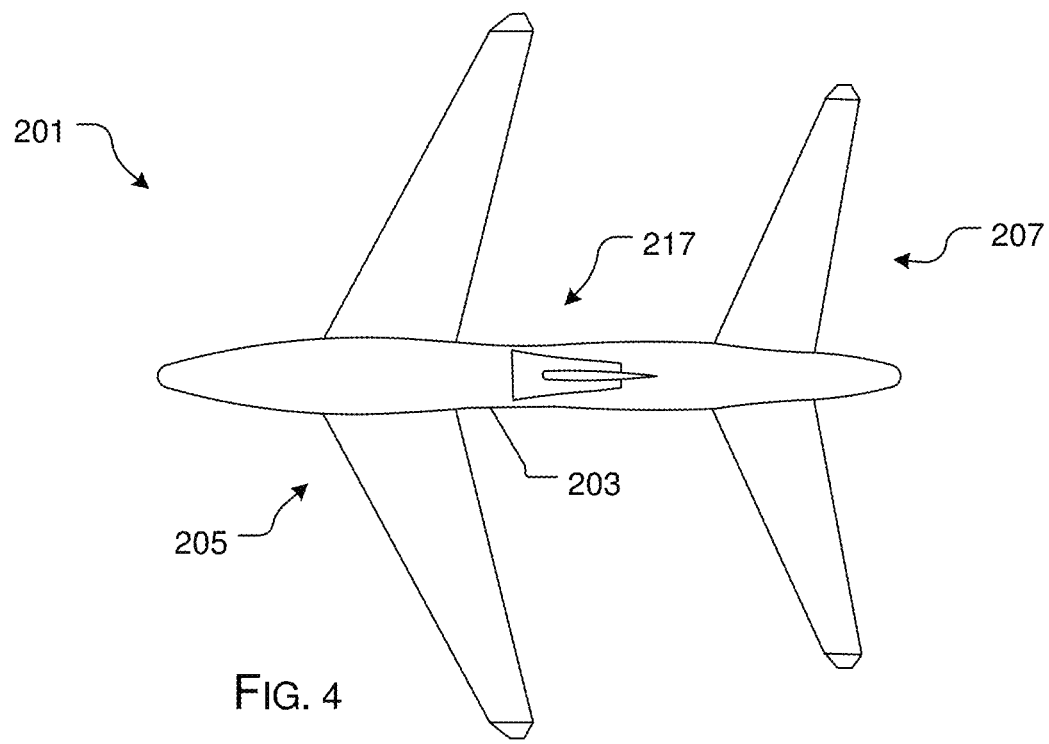
FIG. 4 is a top view of the aircraft of FIG. 2.
Figure 5:
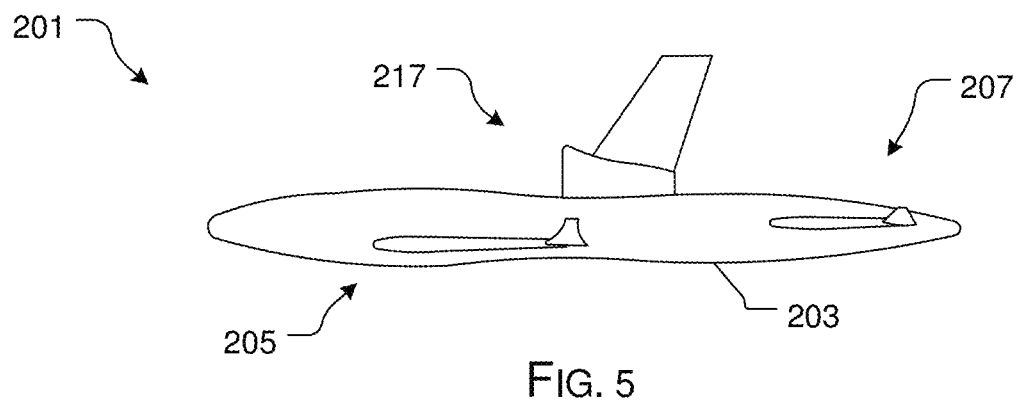
FIG. 5 is a side view of the aircraft of FIG. 2.
Figure 6:
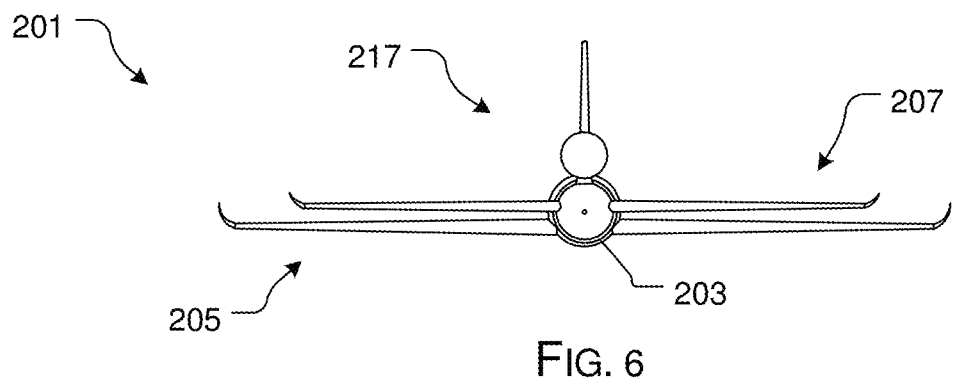
FIG. 6 is a back view of the aircraft of FIG. 2.
Figure 7:
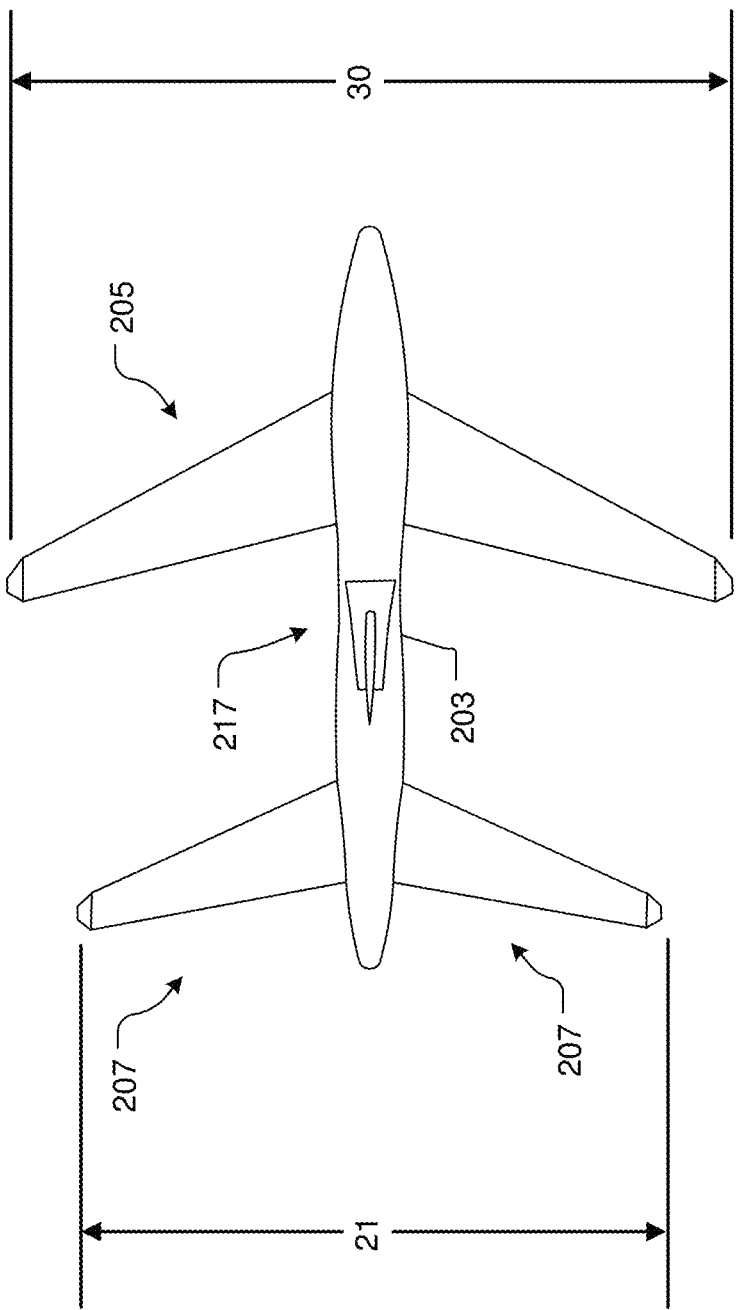
FIGS. 7, 8, and 9 are respective top, side, and back views of the aircraft of FIG. 2 with dimensions in accordance with another preferred embodiment of the present application.
Figure 8:
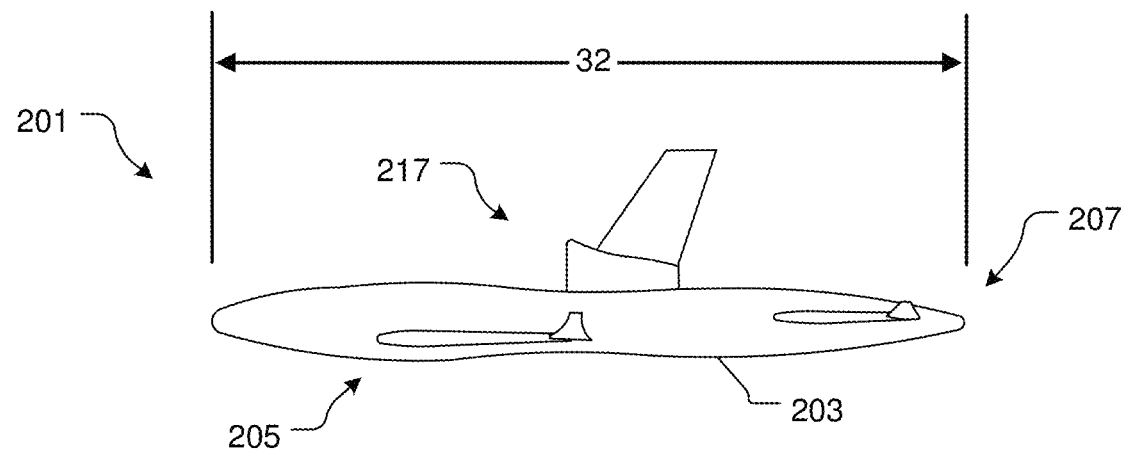
Figure 9:
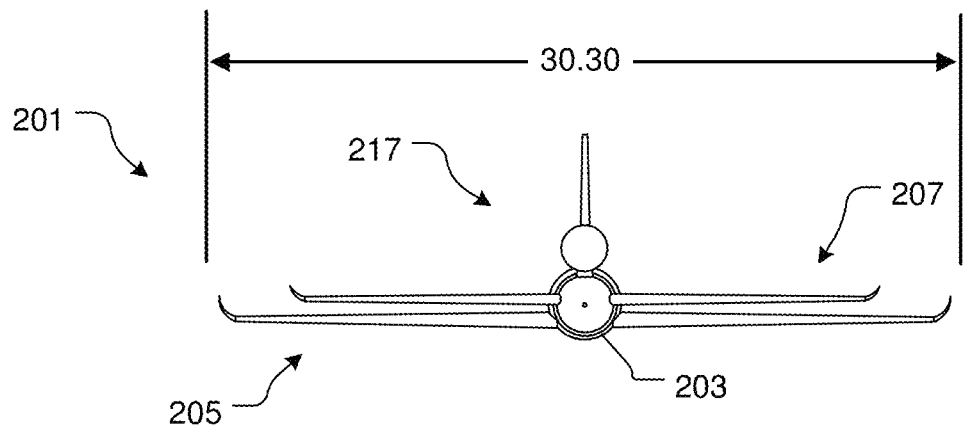

Referring now to FIGS. 7-9 in the drawings respective top, side, and back views of the aircraft of FIG. 2 with dimensions in accordance with another preferred embodiment of the present application. In one embodiment, the front wing span is equal to 30 m, the rear wing span is 21 m, the length of the body is 32 m, and the height is 12 m. With these dimensions, it is determined that the range is approximate 3500 km, the maximum payload is approximately 12,500 kg, and the pax No. is 90-100.

Some of the general characteristics of the engine specification includes a dual-spool, low-bypass-ratio turbofan with a length of 3.91 m, diameter of 1.25 fan, and a dry weight of 2, 150 kg. Some of the components would include a compressor with axial flow, 1-stage fan, 6-stage LP, and a ?-stage HP. The combustor would include nine combustion chambers. The turbine would include 3-stage with 1-stage HP and 3-stage LP. the fuel type would be 1 with oil system of 2. The performance would include a maximum thrust of 93.4 kN-200 series with an overall pressure ratio of 19.4. The mass airflow would be 331 lb/s with the fuel consumption of 19% reduction over JT3D. The specific fuel consumption would be 0.744 kg/daN·h with a thrust-to-weight ratio of 4.43.

It will be appreciated that other shapes, designs, and dimensions are also contemplated along with different types of propulsion systems.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A dual-wing aircraft, comprising:
 a front wing;
 a rear wing;
 a body extending from a front end to a rear end, the body having a narrow section between the front wing and the rear wing and near a center line of the body, the narrow section being formed by tapering of the body before and after the narrow section;
 the front wing having:
  a first section secured to the body; and
  a second section secured to an opposing side of the body;
 the rear wing having:
  a first section secured to the body; and
  a second section secured to an opposing side of the body;
 a propulsion system attached to the narrow section of the body and at a top surface of the body; and
 a vertical stabilizer attached to the propulsion system and positioned between the front wing and the rear wing, the vertical stabilizer extending vertically away from the propulsion system and the body.

2. The aircraft of claim 1, wherein the propulsion system is disposed between the front wing and the rear wing.

3. The aircraft of claim 1, wherein the propulsion system is a jet engine.

4. The aircraft of claim 1, wherein the front wing has a span of 30 m.

5. The aircraft of claim 1, wherein the rear wing has a span of 21 m.

6. The aircraft of claim 1, wherein the body has a length of 32 m.

\* \* \* \* \*